(12) United States Patent
Miichi et al.

(10) Patent No.: US 9,500,485 B2
(45) Date of Patent: Nov. 22, 2016

(54) DEVICE AND METHOD FOR DISPLAYING INFORMATION

(75) Inventors: Tadahiro Miichi, Nishinomiya (JP); Tatsuya Asahara, Nishinomiya (JP)

(73) Assignee: Furuno Electric Co., Ltd., Nishinomiya (JP)

( * ) Notice: Subject to any disclaimer, the term of this patent is extended or adjusted under 35 U.S.C. 154(b) by 0 days.

(21) Appl. No.: 14/379,272

(22) PCT Filed: Feb. 16, 2012

(86) PCT No.: PCT/JP2012/001010
§ 371 (c)(1),
(2), (4) Date: Aug. 15, 2014

(87) PCT Pub. No.: WO2013/121458
PCT Pub. Date: Aug. 22, 2013

(65) Prior Publication Data
US 2015/0025718 A1  Jan. 22, 2015

(51) Int. Cl.
*G01C 21/00* (2006.01)
*G01C 21/34* (2006.01)
*G01C 21/20* (2006.01)
*B63B 49/00* (2006.01)
*G09B 29/10* (2006.01)
*G09B 29/00* (2006.01)
(Continued)

(52) U.S. Cl.
CPC .............. *G01C 21/203* (2013.01); *B63B 49/00* (2013.01); *G01C 21/3664* (2013.01); *G06F 3/041* (2013.01); *G06F 3/0416* (2013.01); *G06F 3/04817* (2013.01); *G06F 3/04845* (2013.01); *G09B 29/007* (2013.01); *G09B 29/10* (2013.01); *G06F 2203/0383* (2013.01)

(58) Field of Classification Search
CPC ................ A63F 13/12; A63F 2300/301; A63F 2300/405; A63F 13/06; A63F 2300/1031; A63F 2300/105; A63F 2300/308; A63F 2300/402; A63F 2300/406; A63F 2300/408; A63F 2300/5546; A63F 2300/556; A63F 2300/801
USPC ........................... 701/400–541; 340/988–996
See application file for complete search history.

(56) References Cited

U.S. PATENT DOCUMENTS

2007/0088497 A1* 4/2007 Jung ................... G01C 21/3647
348/113
2007/0260986 A1* 11/2007 Cristofoli ........... H04N 5/44591
715/722
(Continued)

FOREIGN PATENT DOCUMENTS

JP    2007280093 A    10/2007
JP    2008282390 A    11/2008

OTHER PUBLICATIONS

Japanese Patent Office, International Search Report of PCT/JP2012/001010, Mar. 27, 2012, 1 pages.

*Primary Examiner* — Muhammad Shafi
(74) *Attorney, Agent, or Firm* — Alleman Hall McCoy Russell & Tuttle LLP

(57) ABSTRACT

When an information display layout is created, a touch panel device displays information display areas icons. A user can create the information display layout by dragging the icons to the information display areas. After the drag operation, information corresponding to the icons is displayed in the respective information display areas.

12 Claims, 11 Drawing Sheets

(51) Int. Cl.
*G01C 21/36* (2006.01)
*G06F 3/041* (2006.01)
*G06F 3/0481* (2013.01)
*G06F 3/0484* (2013.01)

(56) References Cited

U.S. PATENT DOCUMENTS

2010/0005419 A1* 1/2010 Miichi .................. G06F 3/0482
  715/828
2010/0275683 A1* 11/2010 Jia ............................ G01P 5/14
  73/170.14
2011/0083103 A1* 4/2011 Shim ..................... G06F 3/0482
  715/810

* cited by examiner

31: FIRST SENSOR IMAGE
32: SECOND SENSOR IMAGE
33: THIRD SENSOR IMAGE

| RATIO OF INFORMATION DISPLAY AREA | DISPLAYABLE INFORMATION |
|---|---|
| 1 (NOT DIVIDED) | NAUTICAL CHART INFORMATION, RADAR INFORMATION, FISH FINDING DATA, CAMERA IMAGE, FACSIMILE IMAGE |
| 1/2 | NAUTICAL CHART INFORMATION, RADAR INFORMATION, FISH FINDING DATA, CAMERA IMAGE |
| 1/4 | NAUTICAL CHART INFORMATION, RADAR INFORMATION, FISH FINDING DATA, WIND INFORMATION, CAMERA IMAGE |

61: THUMBNAIL IMAGES

61: THUMBNAIL IMAGES
63: DELETE KEY
65: SCREEN ADDING BOX

72a: ARRANGEMENT MARK (ONE INFORMATION DISPLAY AREA)
72b: ARRANGEMENT MARK (TWO INFORMATION DISPLAY AREAS)
72c: ARRANGEMENT MARK (THREE INFORMATION DISPLAY AREAS)

71b-71d: INFORMATION DISPLAY AREAS

73a: ICON ASSOCIATED WITH NAUTICAL CHART INFORMATION
73b: ICON ASSOCIATED WITH RADAR INFORMATION
73c: ICON ASSOCIATED WITH UNDERWATER DETECTING INFORMATION
73d: ICON ASSOCIATED WITH WIND INFORMATION
73e: ICON ASSOCIATED WITH CAMERA IMAGE
73f: ICON ASSOCIATED WITH FACSIMILE IMAGE

DEVICE AND METHOD FOR DISPLAYING INFORMATION

TECHNICAL FIELD

The present invention mainly relates to an information display device for displaying information obtained from sensors.

BACKGROUND ART

Conventionally, information display devices which are connected with two or more kinds of sensors and displays information obtained from these sensors as a sensor image have been known. This kind of display device may adopt a configuration in which a display screen is divided so as to simultaneously display a plurality of sensor images. Patent Document 1 discloses this kind of display device.

The display device of Patent Documents 1 is carried in a ship, and creates images based on data acquired from, for example, a sensor or a radar antenna for finding fish. Further, Patent Document 1 discloses a configuration in which a display screen is divided so as to simultaneously display two of the created images.

REFERENCE DOCUMENTS OF CONVENTIONAL ART

Patent Document 1: JP2008-282390A

DISCLOSURE OF THE INVENTION

Problems to be Solved by the Invention

In the meantime, when dividing the display screen to display the images as described above, especially when the number of images which is displayable or the number of dividing a display unit are large, an extremely many combinations of images exist. Although of course the main combinations of images (e.g., a nautical chart and a radar image) are stored in the information display device in advance, considering, for example, likes and dislikes of a user and a difference of usage environment, it is preferred that the user can create the combination of the images and the arrangement thereof (information display layout).

In Patent Document 1, a method of creating a information display layout is not disclosed. Generally, a menu screen is called up through pushing, for example, a menu button, and a mode of creating the information display layout is displayed. Further, the user selects a method of dividing a display screen, thereafter, selects any of the divided screens by, for example, an arrow key or a rotary key, and selects the image to be displayed on the divided screen. By repeating this operation, the information display layout is created.

However, because this method requires the operation of selecting the divided screen and the operation of selecting the image to be displayed on the divided screen, it is time taking. Further, when using the arrow key, a plurality of operations are required to select a desired image. On the other hand, when using the rotary key, a rotating direction and a moving direction of a cursor may not be grasped instinctively.

SUMMARY AND EFFECTS OF THE INVENTION

The present invention is made in view of the above situation, and one object of the invention is to provide, in an information display device for displaying information within one or more information display ranges, a configuration with which an information display layout can be creased promptly and instinctively.

Problems to be solved by the invention is described above, and means for solving the problems and effects thereof will be described below.

According to a first aspect of the invention, an information display device having the following configuration is provided. Thus, the information display device includes a touch detector, an information acquirer, a display unit, a first display controller, a second display controller, and a layout creator. The touch detector detects a drag operation through a touch operation on a display screen. The information acquirer acquires at least two of navigation information showing a position of the device on a map, underwater detecting information obtained from an ultrasonic transducer for detecting underwater directly below the device, radar information obtained from a radar antenna for detecting a position of an object around the device, an azimuth sensor information obtained from an azimuth sensor, a speed sensor information obtained from a speed sensor, and wind information obtained from a vane anemometer. The display unit is provided with one or more information display areas in its display screen, and has an information display mode in which the information acquired by the information acquirer is displayed in the information display area, and a layout creating mode in which an information display layout is created through determining information to be displayed in the information display area and an arrangement of the information to be displayed. The first display controller displays on the display unit, in the layout creating mode, icons indicating information that is acquirable by the information acquirer, and the information display area or the plurality of arranged information display areas. The second display controller displays, when the drag operation of any of the icons into the information display area is detected in the layout creating mode, the information corresponding to the icon in the information display area that is a destination of the drag operation. The layout creator creates an information display layout based on the content displayed by the second display controller in the layout creating mode. In the information display mode, the information is displayed on the display unit based on the information display layout.

In this manner, the operation of selecting the information display area and the operation of selecting the information to be displayed in the selected information display area can be performed with one action, and thus, the information display layout can be created smoothly. Further, the information display layout can be created by only performing the drag operation, and thus, the instinctive and simple operation can be achieved. Moreover, in the layout creating mode, not the icon but the information (e.g., a nautical chart or a radar image) is displayed in the information display area, and thus, a user can perform the work of creating the information display layout while confirming how the information is displayed in an actual operation.

In the above information display device, when the drag operation from inside to outside of the information display area where the information is already displayed is detected in the layout creating mode, the information that is displayed in the information display area is preferred to be changed to be not displayed.

In this manner, the operation of displaying the information in the information display area and the operation of deleting the information from the information display area can be performed by the drag operation, and thus, an operability can be improved.

In the above information display device, when the icon corresponding to the information different from the information that is already displayed in the information display area is dragged into the same information display area in the layout creating mode, the information to be displayed in the information display area is preferred to be switched to the information corresponding to the later dragged icon.

In this manner, latest information can be displayed in the information display area without deleting the information corresponding to the icon dragged earlier. Therefore, a comfortable operation can be achieved by saving the user's trouble of work.

In the above information display device, in the layout creating mode, the icon of which the information is already displayed in the information display area is preferred to be displayed in a display mode different from the other one or more icons.

In this manner, an icon that has not been selected yet can be emphasized in view by displaying the icon of which the information is already displayed in darker color, for example. Thus, the work of creating the information display layout can be performed comfortably.

In the above information display device, in the layout creating mode, the display unit is preferred to display a plurality of arrangement marks indicating the arrangement of the information display areas, and display the information display areas in the arrangement indicated by the arrangement mark selected by a user.

In this manner, the arrangement of the information display device can be changed easily in the layout creating mode.

In the above information display device, restriction information in which a ratio of the information display area with respect to the display screen is associated with the information displayable in the information display area with the ratio is preferred to be stored.

In this manner, the information can only be displayed in size or an aspect ratio of the display screen suitable for the information. Therefore, after the creation of the information display layout, a case that "contents received by a facsimile cannot be grasped because the information display area of the facsimile is too small" can be prevented, for example.

In the above information display device, in the layout creating mode, when the information display area where the information is displayable based on the restriction information does not exist, a display mode of the icon corresponding to the information is preferred to be changed or the icon is preferred to be not displayed.

In this manner, the icon that cannot be selected because of the aspect ratio of the display screen, etc. can be differentiated from another icon, and thus, the work of creating the information display layout can be performed comfortably.

In the above information display device, in the layout creating mode, the display mode is preferred to be different between the information display area where the information is not displayable due to the restriction information and the information display area where the information is displayable.

In this manner, a location to which the drag operation is possible can be understood, and thus, a comfortable operability can be achieved.

In the above information display device, it is preferred to have the following configuration. Thus, the display unit has a layout selecting mode in which a list of the information display layouts where the information is displayed in the information display area. The information display layout selected in the layout selecting mode is displayed in the information display mode.

In this manner, the contents of the information display layouts can be displayed in list to be easily understood, and thus, the information display layout required according to the situation can suitably be selected.

In the above information display device, in the layout selecting mode, the information display layout created by the layout creator is preferred to be also displayed.

In this manner, the information display layout created once can be displayed in the information display mode without recreating it.

According to a second aspect of the invention, an information display device having a configuration in which "the information acquired by the information acquirer" in the above invention is "information created by an application" can be achieved.

In this manner, the invention can be achieved with the information display device where the information created by a plurality of applications are displayable in a plurality of information display areas.

According to third and fourth aspects of the invention, an information display device and an information displaying method having a configuration in which the information acquired by the information acquirer is not limited to the above examples.

In this manner, the operation of selecting the information display area and the operation of selecting the information to be displayed therein can be performed with one action, and thus, the information display layout can be created smoothly.

MODE OF CARRYING OUT THE INVENTION

Figure 1:
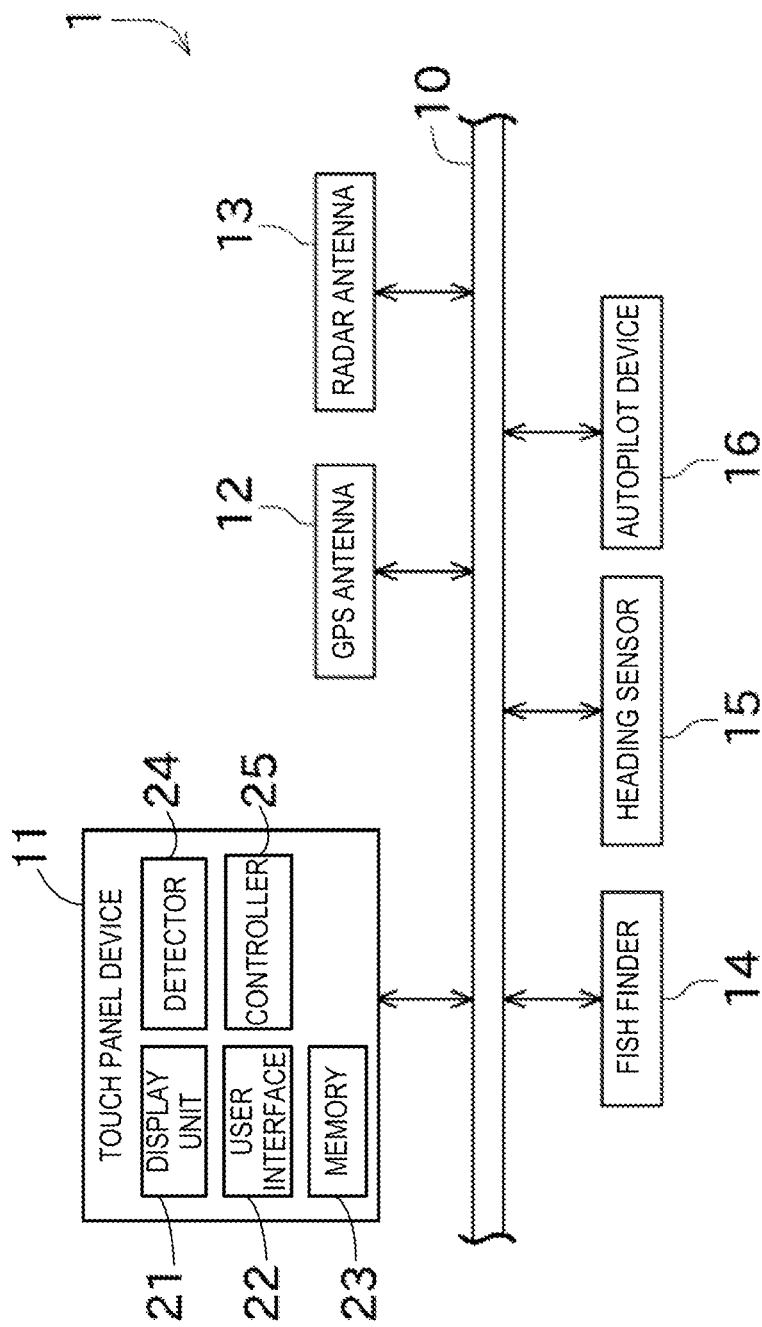
FIG. 1 is a block diagram showing an entire configuration of a ship instrument network system.
Figure 2:
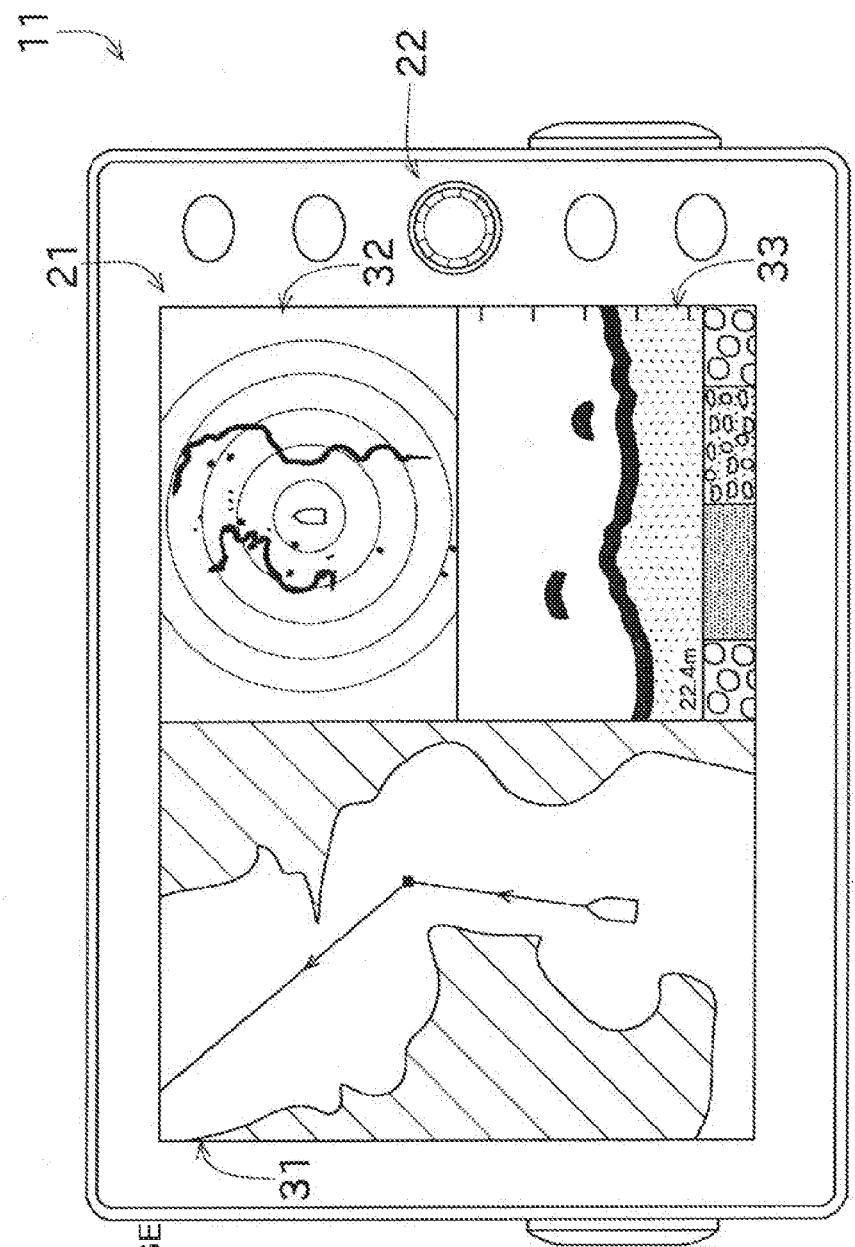
FIG. 2 is an elevational view of a touch panel device.

Next, one embodiment of the invention is described with reference to the drawings. FIG. 1 is a block diagram showing an entire configuration of a ship instrument network system 1. FIG. 2 is an elevational view of a touch panel device 11.

The ship instrument network system 1 of this embodiment includes a plurality of ship instrument connected to a ship network 10. The ship instrument can exchange detected information via the ship network 10. As a standard of the ship network 10, LAN (Local Area Network) or CAN (Controller Area Network) can be employed, for example.

As shown in FIG. 1, the ship instrument network system 1 of this embodiment includes a touch panel device 11 (information display device), a GPS antenna 12 (GNSS sensor), a radar antenna 13, a fish finder 14 (acoustic sensor), a heading sensor 15, and an autopilot device 16.

The touch panel device 11 has a configuration to create and display an image (sensor image) based on information detected by other ship instrument (sensors), detect a touch operation to a display screen, and perform processing according to a detection result. Specifically, the touch panel device 11 includes a display unit 21, a user interface 22, a memory 23, a detector 24, and a controller 25.

The display unit 21 is comprised of, for example, a liquid crystal display, and can display, for example, the sensor image, and various setting screens on the display screen as described above.

The user interface 22 is comprised of hardware keys, such as a rotary key to which a clockwise or counterclockwise rotational operation is possible, and a menu key to call a menu screen. Note that, since the touch panel device 11 can be inputted and instructed by a touch operation on the display screen, the number of keys in the user interface 22 can be reduced.

The memory 23 stores contents of program(s) to be executed by the controller 25, nautical chart information, traveling route(s) set by a user, etc.

The detector 24 detects the touch operation on the screen by the user. In this embodiment, a projected electric capacity system is used as a system for detecting the touch operation. This system has a configuration in which a plurality of high transparency electrodes are arranged on a display panel and a touched location is detected based on a change in electric capacity of each electrode that occurs when a fingertip approaches the panel. With this configuration, not only the touched location but also a finger motion in a touching state (change of the touched location) can be detected. Moreover, the detector 24 can also detect touched locations and changes of each touched location when two or more locations are touched simultaneously. The touched location and the change in the touched location detected by the detector 24 are outputted to the controller 25. Note that, the system for detecting the touch operation is not limited to the projected electric capacity system, but any other suitable system may be employed. Moreover, other than the touch operation with a finger, a configuration in which a touch operation using a tapered stick member is detected may also be adopted, for example.

The controller 25 creates the sensor images (e.g., a radar image and a nautical chart around the ship) based on the stored content of the memory 23 and information received from other ship instrument, and displays them on the display unit 21. The controller 25 receives information from a plurality of ship instrument, and creates a plurality of sensor images. The controller 25 can switch between a mode in which only one of the plurality of sensor images is displayed on the display screen (full screen mode) and a mode in which the display screen is divided and the plurality of sensor images are displayed (divided screen mode: see FIG. 2).

Moreover, the controller 25 executes a matching between the content of the touch operation set in advance (touch gesture) and a change of the touched location detected by the detector 24 to identify which touch gesture is performed by the user. Then, the controller 25 performs processing corresponding to the identified touch gesture.

An example of the touch gesture includes a "drag operation." The drag operation is a touch gesture in which a touching finger (usually one finger) is moved in a predetermined direction without separating from the display screen. Scrolling of the image is usually associated with the drag operation. Note that, the drag operation includes, for example, an operation in which a finger is quickly moved while the finger touches the display screen (flick operation). Moreover, another example of the touch gesture includes a "pinch operation." The pinch operation is an operation in which, without separating two touching fingers from the display screen, the fingers are moved closer to each other (pinch in) or separated from each other (pinch out). Processing of changing a scale of the image (processing of performing a zooming) is usually associated with the pinch operation. Note that, the controller 25 can also identify various touch gestures other than the examples described above.

The GPS antenna 12 receives positioning signals from GPS satellites (GNSS satellites), and outputs them to the touch panel device 11 and the like via the ship network 10. The controller 25 of the touch panel device 11 obtains a location of the ship based on the positioning signals (in detail, a location of a GPS antenna or an absolute location in a terrestrial reference frame). Note that, a configuration in which a calculation for finding a location based on the positioning signals is performed on the GPS antenna 12 side and the location of the ship is outputted to the touch panel device 11 may also be adopted.

The touch panel device 11 can exert a function as a navigation equipment based on the obtained location of the ship and the nautical chart information stored in the memory 23. Specifically, based on the acquired location of the ship and the nautical chart information stored in the memory 23, the controller 25 can superimpose the location of the ship on the nautical chart and display it on the display unit 21. Moreover, the controller 25 can find a ground speed of the ship by using the location of the ship which changes with time and find a trace of the ship to display them on the display unit 21. Further, the controller 25 can create a traveling route and display it on the display unit 21 by a user selecting a destination and a waypoint (a stopover) with a touch operation (see a first sensor image 31 shown in FIG. 2).

The radar antenna 13 transmits a microwave and receives a reflection wave from an object. This reflection wave is outputted to the touch panel device 11 after suitable signal processing is performed. The touch panel device 11 creates a radar image based on the reflection wave. Specifically, the controller 25 of the touch panel device 11 finds a distance of the object based on a time length after transmitting the microwave until it receives the reflection wave. Moreover, the controller 25 finds a direction in which the object exists based on a transmitted direction of the microwave. Thus, the controller 25 creates the radar image and displays it on the display unit 21 (see a second sensor image 32 shown in FIG. 2).

The fish finder 14 is comprised of a transducer and an analyzer. The transducer is installed on, for example, the bottom of the ship, and it discharges an ultrasonic wave directly under into the sea and receives the reflection wave from a seabed or a school of fish. The analyzer creates fish finding data (data acquired by the fish finder or data of the school of fish or the seabed) based on the reflection wave. Moreover, the fish finder 14 of this embodiment has a function to determine an underwater state (a bottom sediment type) based on the acquired fish finding data (underwater detecting information). Specifically, the analyzer can determine whether the seabed falls under any of rocks, gravel (stones), sand, and mud with high possibility, by analyzing the received reflection wave. The fish finding data and the determined bottom sediment type are outputted to the touch panel device 11. Then, the controller 25 of the touch panel device 11 creates a third sensor image 33 (see FIG. 2) based on the received data, and displays it on the display unit 21. In the third sensor image 33, a vertical axis indicates fish finding data and a horizontal axis indicates a time point when the fish finding data is acquired (it gets older as it goes toward the left end of the display screen).

The heading sensor 15 is configured to detect a heading of the ship (a direction of a bow of the ship) by an absolute azimuth in the terrestrial reference frame. Generally, a ship travels forward, toward the bow direction. Therefore, it can also be said that the heading sensor 15 detects an azimuth of a forward direction of a hull of the ship. A magnetic azimuth sensor, a GPS compass or the like may also be used for the heading sensor 15.

The autopilot device 16 is a device for automatically operating a rudder so that the ship travels along the set traveling route. Specifically, the autopilot device 16 finds how much the bow of the ship is to be changed, based on the heading acquired from the heading sensor 15 and the traveling route acquired from the touch panel device 11. Then, the autopilot device 16 coincides the course of the ship with the traveling route by changing an angle of the rudder according to the calculated value.

The ship instrument network system 1 of this embodiment is configured as described above. Note that, the ship instrument which constitutes the ship instrument network system 1 may be arbitrary configured, and the system may have a configuration in which ship instrument other than illustrated above is connected, or may have a configuration in which two or more ship instrument of similar type is connected. Moreover, the processing of the data acquired by the ship instrument may be configured to be performed by the ship instrument concerned, or may be configured to be performed by the controller 25 of the touch panel device 11.

Moreover, although they are not illustrated in FIG. 1, the ship instrument network system 1 includes a vane anemometer, a camera, and a facsimile device They acquire information relating to a wind speed and a wind direction (wind information), a camera image, a received facsimile image and the like, respectively, and the touch panel device 11 can display them.

Next, an information display layout is described. The information display layout is a layout showing where the sensor images and the like to be displayed on the display unit 21 in an information display mode (the full screen mode or the divided screen mode which are modes for displaying the sensor images and the like) are to be arranged. The touch panel device 11 of this embodiment is stored with a plurality of information display layouts in advance. Moreover, the touch panel device 11 can create a new information display layout according to the operation by the user, etc.

Figures 3, 4:
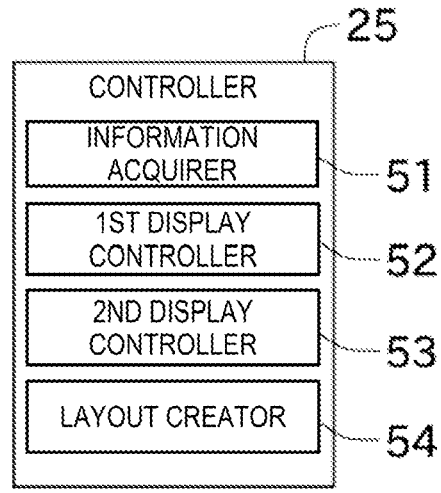
FIG. 3 is a block diagram showing a configuration of a controller.
FIG. 4 is a chart showing contents of restriction information associating a ratio of an information display range with information that can be displayed at the ratio.

Hereinafter, a method of selecting the information display layout and a method of creating the same are described. First, the detailed configuration of the controller 25 is described with reference to FIG. 3. FIG. 3 is a block diagram showing the configuration of the controller 25.

As shown in FIG. 3, the controller 25 includes an information acquirer 51, a first display controller 52, a second display controller 53, and a layout creator 54.

The information acquirer 51 acquires the sensor images, the wind information, the camera image, and the facsimile image, etc. Note that, in this embodiment, it has a configuration in which an image creator (not illustrated) of the touch panel device 11 creates the sensor images and the like, and the information acquirer 51 acquires the sensor images from the image creator. Note that, alternative to this configuration, it may have a configuration in which an external instrument (e.g., fish finder 14) of the touch panel device 11 creates the images. In this case, the information acquirer 51 acquires the images from the external instrument of the touch panel device 11.

The first and second display controllers 52 and 53 perform a control of displaying information required in creating the information display layout (described later in detail). The layout creator 54 creates the information display layout according to the operation by the user (described later in detail), for example. Thus, the controller 25 can execute a plurality of kinds of processing; however, these processing is executed by a single processor package (including a multi core processor).

Figure 6A:
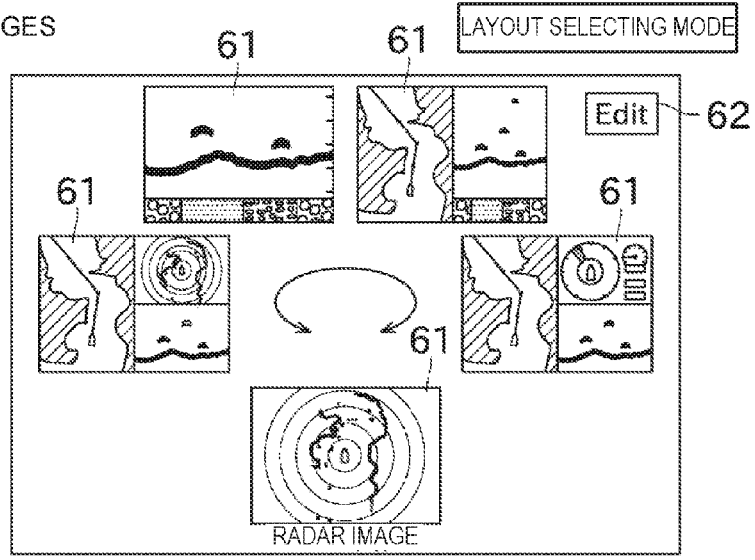
FIGS. 6(a) and 6(b) are views showing a layout selecting mode and a layout editing mode.
Figure 6B:
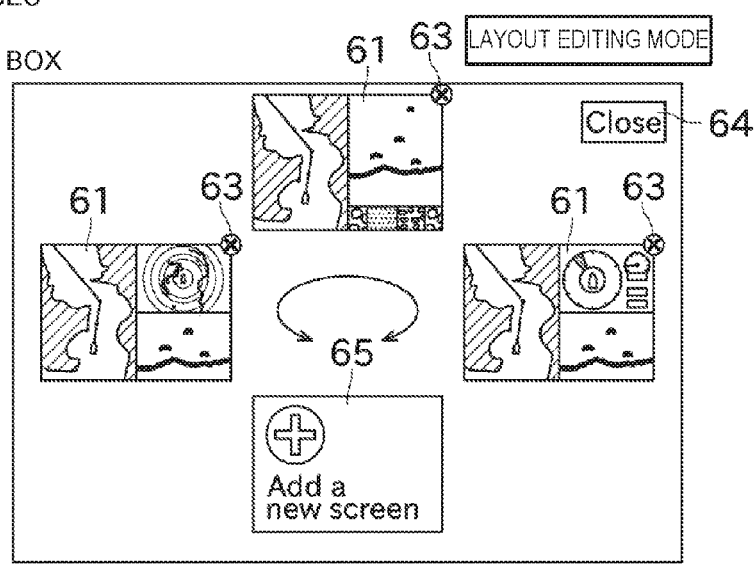

Next, the modes which the touch panel device 11 (display unit 21) holds are described with reference to FIG. 4, FIGS. 6(*a*) to 7(*b*). FIG. 4 is a chart showing contents of restriction information. FIGS. 6(*a*) to 7(*b*) are views showing contents on the display screen. Note that, a current mode of the touch panel device 11 is illustrated in a rectangular box in the upper right area in FIGS. 6(*a*) to 12(*b*).

The touch panel device 11 has a layout selecting mode, a layout editing mode, and a layout creating mode, in addition to the information display modes described above.

The layout selecting mode is a mode of displaying a list of the information display layouts. In the layout selecting mode, as shown in FIG. 6(*a*), a plurality of thumbnail images 61 and an Edit key 62 are displayed.

The thumbnail images 61 are images showing the information display layouts. In this embodiment, specific images (images similar to those in the information display mode) are displayed as the thumbnail images 61. The thumbnail images 61 are displayed with not only the information display layouts stored in the touch panel device 11 in advance but also the information display layout created by the user. The thumbnail images 61 are arranged in a loop (circle), and the thumbnail images 61 can be rotated by dragging any of the thumbnail images 61 to draw an arc centering on the center of the display screen. Further, a name of the information display layout is displayed with the thumbnail image 61 displayed on the side closest to the user. Note that, the user can shift the mode to the information display mode by touching a desired thumbnail image 61 for a moment and separating the finger therefrom (tap). In the information display mode after the shift, the sensor images and the like are displayed in the tapped information display layout.

The Edit key 62 is a key for shifting the mode from the layout selecting mode to the layout editing mode.

The layout editing mode is a mode for deleting or adding the information display layout. In the layout editing mode, as shown in FIG. 6(*b*), a delete key 63 is displayed in the upper right area in each thumbnail image 61. Moreover, in the layout editing mode, a Close key 64 and a screen adding box 65 are also displayed.

The delete key 63 is a key for deleting the information display layout. Note that, in this embodiment, there exists an information display layout that cannot be deleted, and the thumbnail image 61 of this information display layout is not displayed in the layout editing mode. The Close key 64 is a key for ending the layout editing mode and returning to the layout selecting mode. The screen adding box 65 is a box (key) for shifting the mode to the layout creating mode.

Figure 7A:
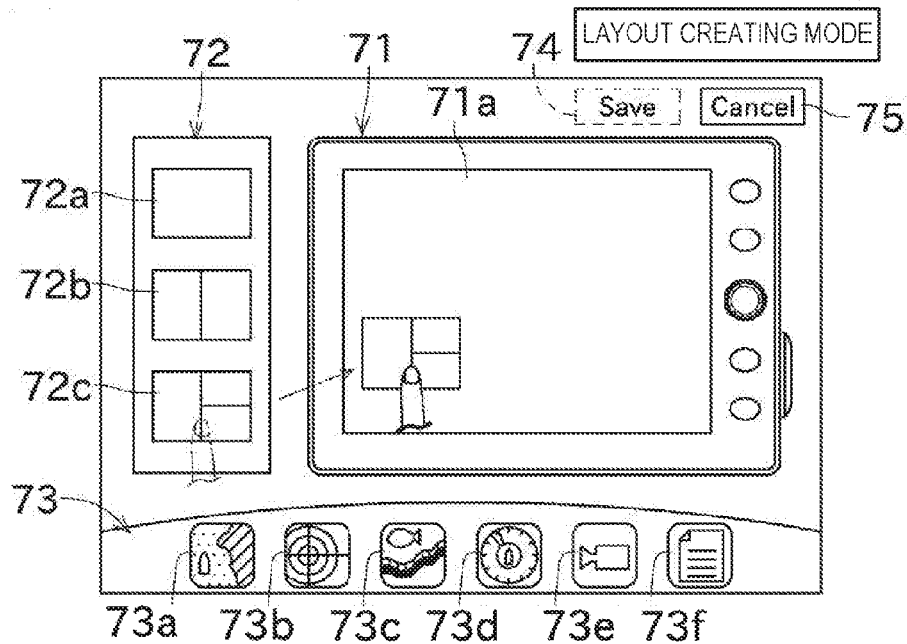
FIGS. 7(a) and 7(b) are views showing display screens when an arrangement of the information display range is determined in the layout creating mode.
Figure 7B:
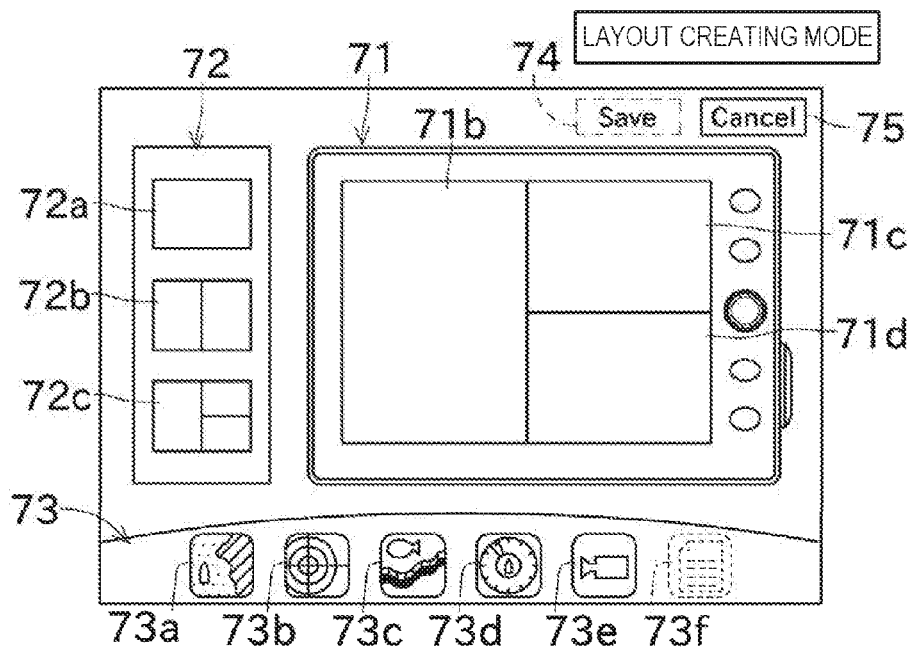

The layout creating mode is a mode for creating a new layout. In the layout creating mode, as shown in FIG. 7(*a*), a device image 71, an arrangement mark display area 72, an icon display are 73, a Save key 74, and a Cancel key 75 are displayed. Note that, the first display controller 52 described above performs a control of displaying the arrangement mark display area 72 and the icon display area 73 on the display unit 21, and the second display controller 53 performs a control of displaying the device image 71 on the display unit 21.

The device image 71 is a pattern diagram of an elevational view of the touch panel device 11. The device image 71 is displayed with one or more information display areas arranged. The user creates the information display layout by assigning the information to be displayed, in the information display area. Note that, in FIG. 7(*a*), an information display area 71*a* is displayed in full screen (not divided). In FIG. 7(*b*), three arranged information display areas 71*b*, 71*c* and 71*d* are displayed.

In the arrangement mark display area 72, arrangement marks 72*a* to 72*c* are displayed. The arrangement mark is a mark for changing the arrangement of the information display area(s) displayed in the device image 71. Note that, the arrangement mark 72*a* indicates the arrangement in which the sensor images and the like are displayed in full screen. The arrangement mark 72*b* indicates the arrangement in which two of the information display areas are arranged laterally. The arrangement mark 72*c* includes three of the information display areas and indicates the arrangement in which the three information display areas are arranged on the left side, upper right side, and lower right side, respectively.

In the icon display area 73, icons 73*a* to 73*f* associated with the information acquired from the information acquirer 51 are displayed. The icon 73*a* is associated with the nautical chart information, the icon 73*b* is associated with the radar information, the icon 73*c* is associated with the fish finding data (underwater detecting information), the icon 73*d* is associated with the wind information, the icon 73*e* is associated with the camera image, and the icon 73*f* is associated with the facsimile image. The user drags any of the icons to any of the information display areas to assign the information to be displayed, and creates the information display layout.

Further, in this embodiment, the information described above is not displayable in all the information display areas, and there is a restriction provided based on the size of the information display area or an aspect ratio of the display screen, etc. FIG. 4 displays the restriction information. The restriction information is, as shown in FIG. 4, information in which a ratio of the information display area is associated with the information that can be displayed with the ratio concerned. Note that, "the ratio of the information display area" for the information display area 71*a* is 1, the information display area 71*b* is 1/2, and the information display areas 71*c* and 71*d* are 1/4 each.

As shown in FIG. 4, since the facsimile image can only be displayed in full screen (the divided ratio is 1), it cannot be displayed when the information is displayed in a plurality of information display areas. Therefore, in this embodiment, it has a configuration in which when the plurality of information display areas are displayed in the device image 71, the icon 73*f* is grayed out (see FIG. 7(*b*)). Note that, it may have a configuration in which the display color or the like is changed alternative to the gray out, or it may have a configuration in which the icon 73*f* is not displayed.

The Save key 74 is a key for saving the information display layout after the creation thereof, and displaying it. In FIGS. 7(*a*) and 7(*b*), because the creation of the information display layout is not completed, it is grayed out. The Cancel key 75 is a key for ending the layout creating processing and returning to the layout editing mode.

Figure 5:
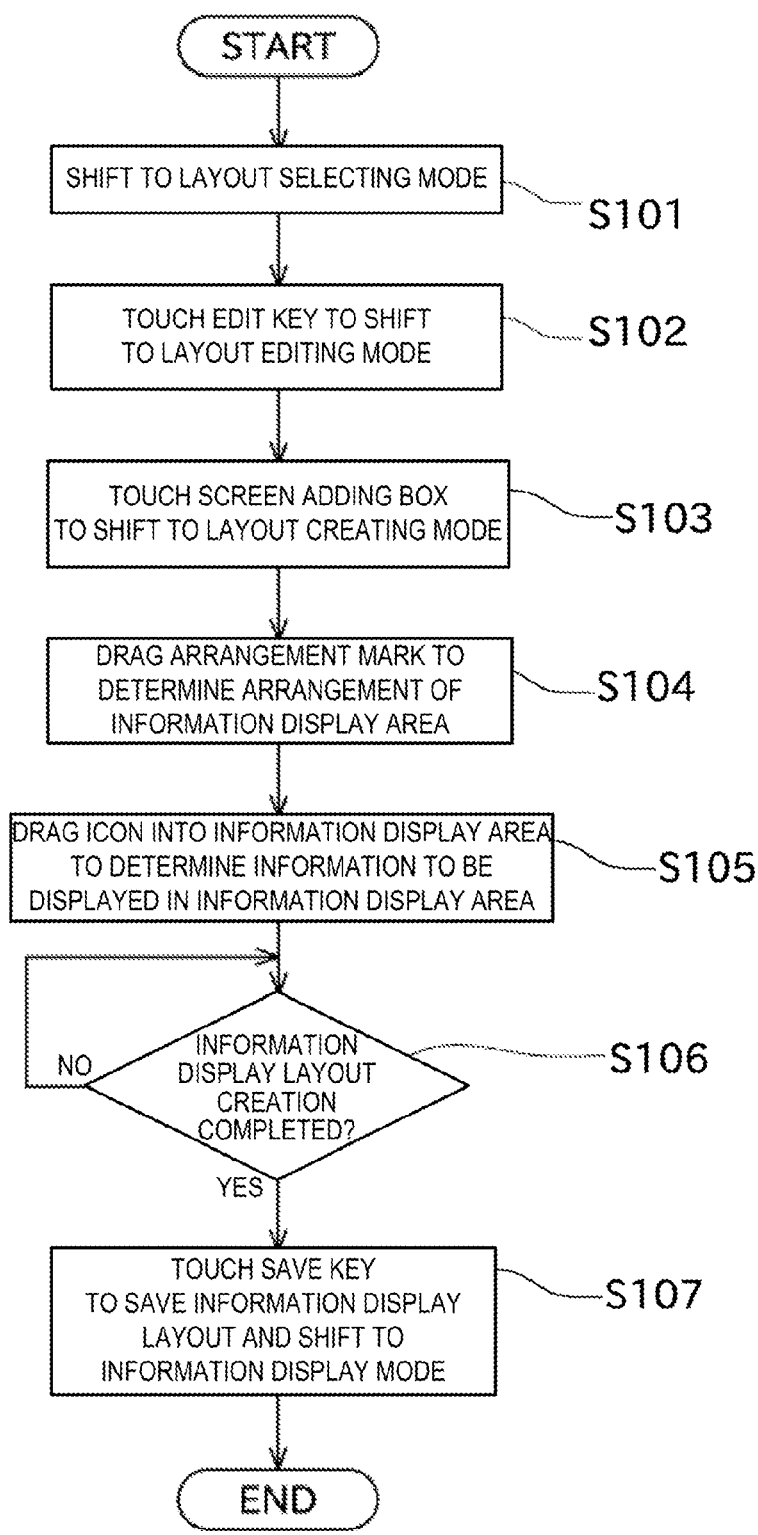
FIG. 5 is a flowchart showing an operation performed by a user when creating an information display layout.

Next, the processing performed by the user when creating the information display layout is described. FIG. 5 is a flowchart showing the operation performed by the user when creating the information display layout. First, the user performs, for example, the operation of the user interface 22 or a predetermined touch operation to shift the touch panel device 11 (display unit 21) to the layout selecting mode (S101). Further, the Edit key 62 is touched to shift it to the layout editing mode (S102). Next, the user touches the screen adding box 65 to shift it to the layout creating mode (S103).

Next, the user drags an icon to the information display area to determine the information to be displayed in the information display area (S105). Hereinafter, cases where the icons 73*a* and 73*d* are dragged are described with reference to FIGS. 8(*a*) to 9(*b*). Note that, in FIGS. 8(*a*) to 9(*b*), a white frame section of the information display area is indicated by the hatched line, and a red frame section is indicated by being daubed.

When the user drags an icon, the display mode (e.g., display color) of each of the frame sections of the information display areas 71*b* to 71*d* changes based on the restriction information. Specifically, the display mode is different between cases where the information corresponding to the icon to be dragged can be displayed and cannot be displayed. Therefore, when the user drags the icon 73*a*, because the nautical chart information can be displayed regardless of the ratio, the frame sections of all the information display areas 71*b* to 71*d* are displayed in white (see FIG. 8(*a*)). On the other hand, when the user drags the icon 73*d*, because the wind information can only be displayed in the information display area with the ratio of 1/4, the frame section of the information display area 71*b* is displayed in red, and the frame sections of the information display areas 71*c* and 71*d* are displayed in red.

Figure 8A:
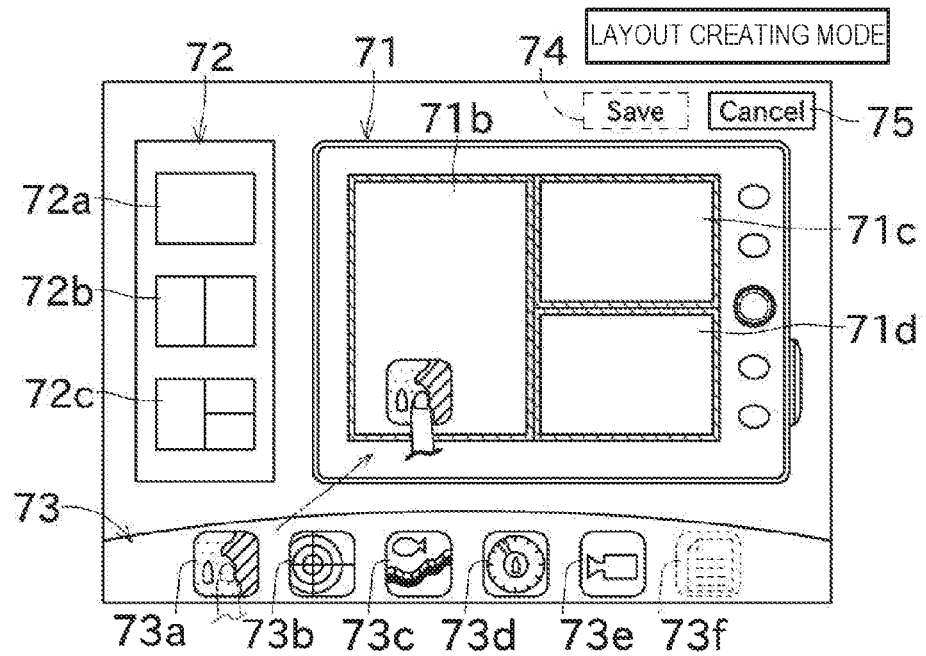
FIGS. 8(a) and 8(b) are views showing a change of the display screen when an icon corresponding to a nautical information is dragged into the information display range.
Figure 8B:
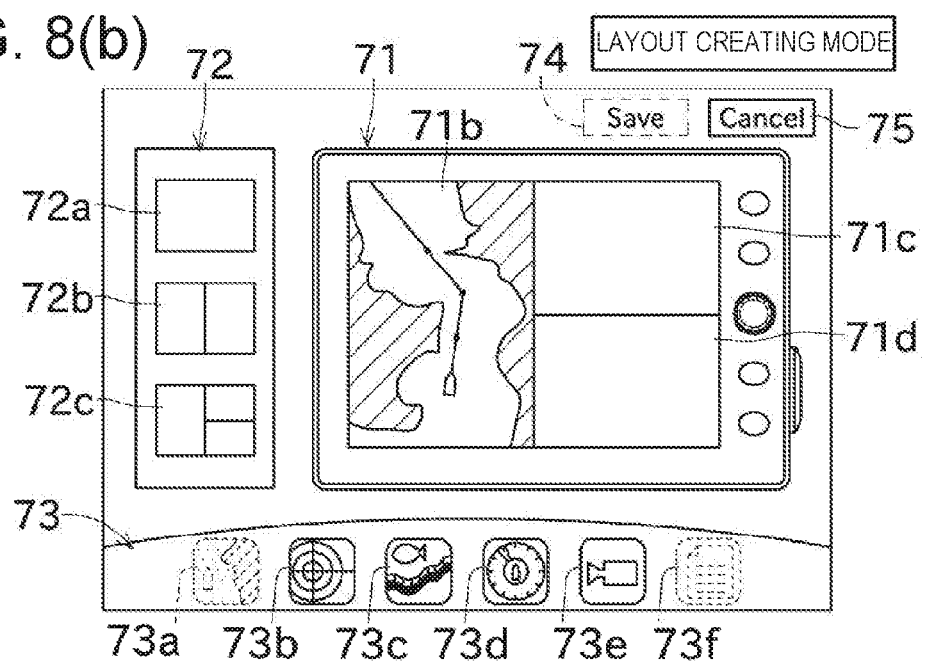
Figure 9A:
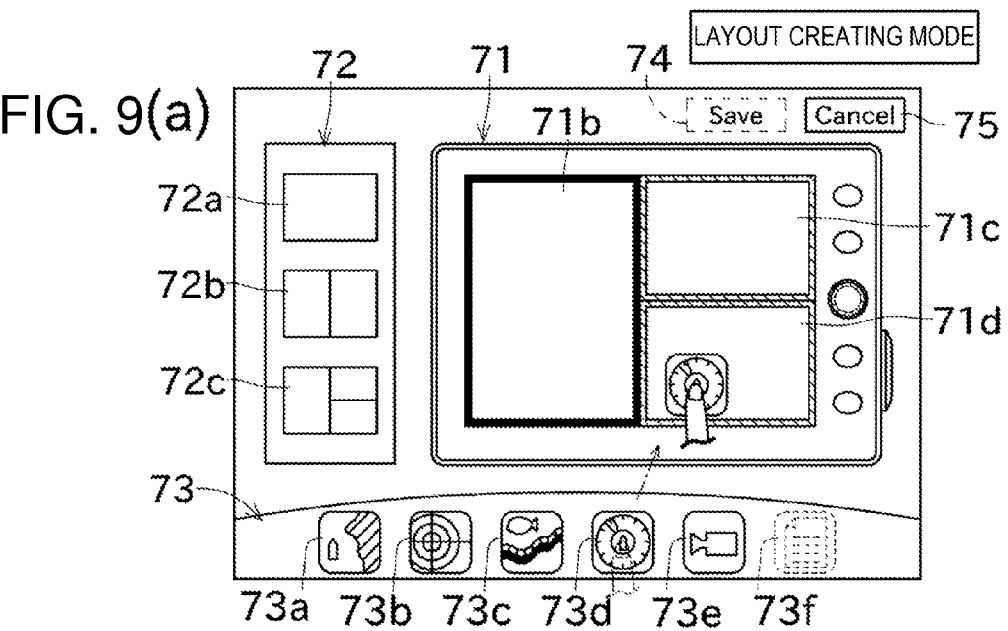
FIGS. 9(a) and 9(b) are views showing a change of the display screen when an icon corresponding to wind information is dragged into the information display range.
Figure 9B:
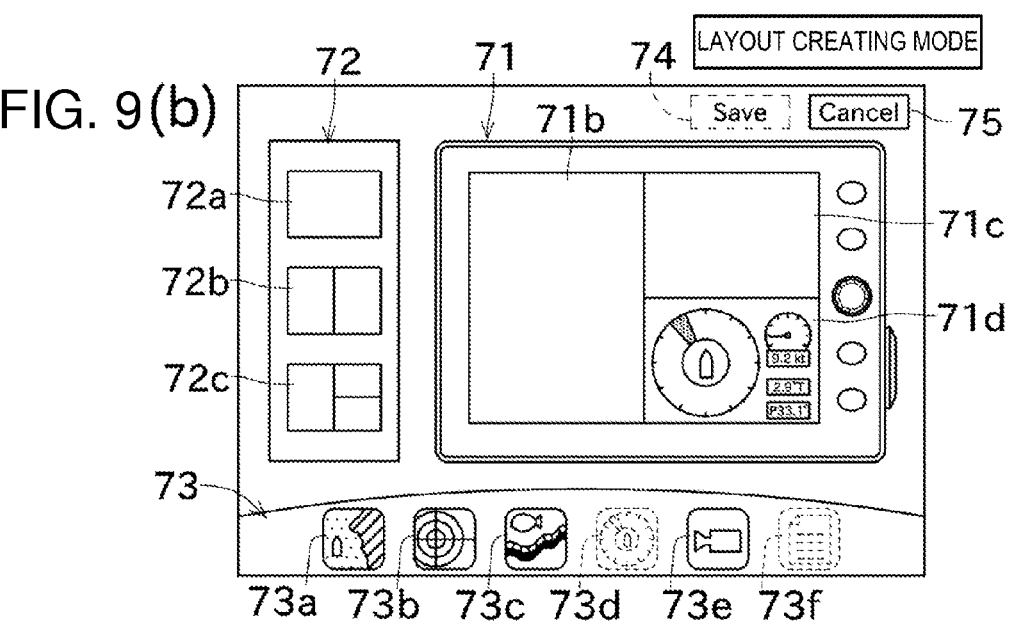

Further, as shown in FIG. 8(*b*), through the user dragging the icon 73*a* to the information display area 71*b*, the nautical chart information corresponding to the icon 73*a* is displayed in the information display area 71*b*. Note that, after the nautical chart information is displayed, the icon 73*a* is grayed out. In this manner, the icon that has been selected and the icon that has not been selected can be differentiated from each other and, thus, the operation of creating the information display layout can be performed smoothly.

Next, a method of editing the information display layout is described with reference to FIGS. 10(*a*) to 11(*b*).

Figure 10A:
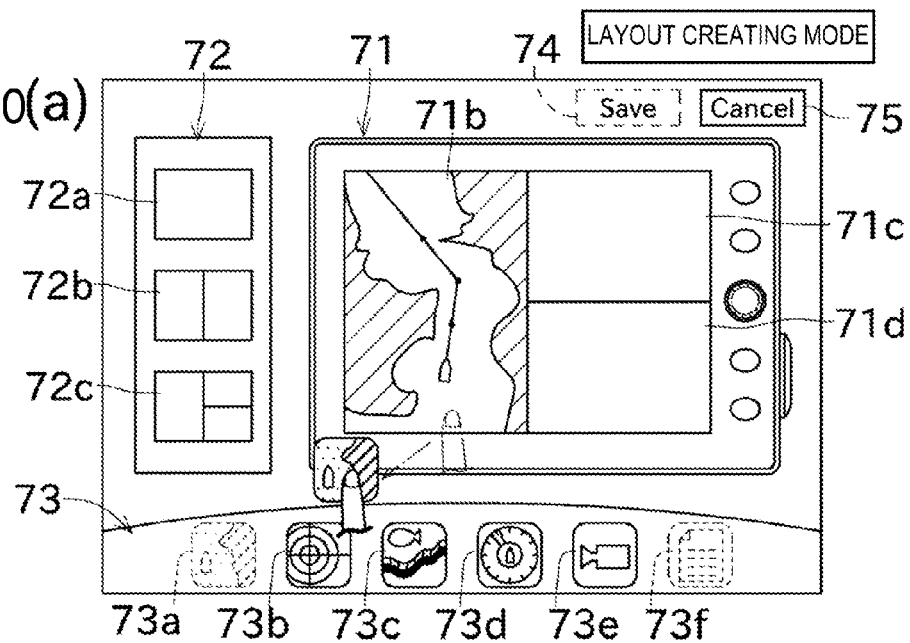
FIGS. 10(a) and 10(b) are views showing a change of the display screen when a drag operation is performed from inside to outside of the information display range.
Figure 10B:
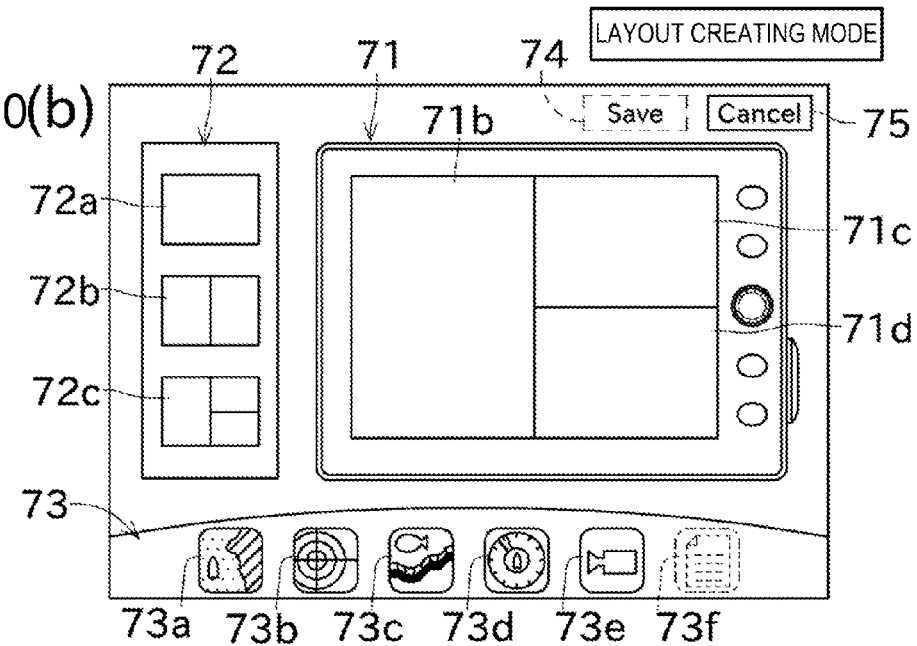

As shown in FIGS. 10(*a*) and 10(*b*), the user can delete the nautical chart information which is currently displayed (have it not displayed) by performing the drag operation from inside the information display area 71*b* to the outside. Note that, it may have a configuration in which the nautical chart information is dragged from the information display area 71*b* to any of the other information display areas and displayed in the information display area which is the destination of the drag operation.

Figure 11A:
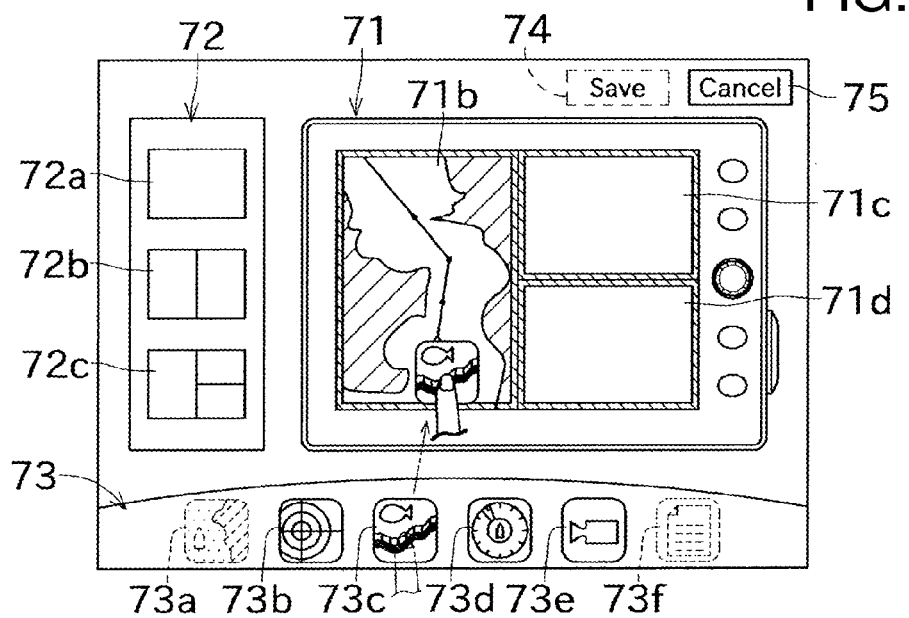
FIGS. 11(a) and 11(b) are views showing a change of the display screen when an icon is further dragged into the information display range where the information is currently displayed.
Figure 11B:
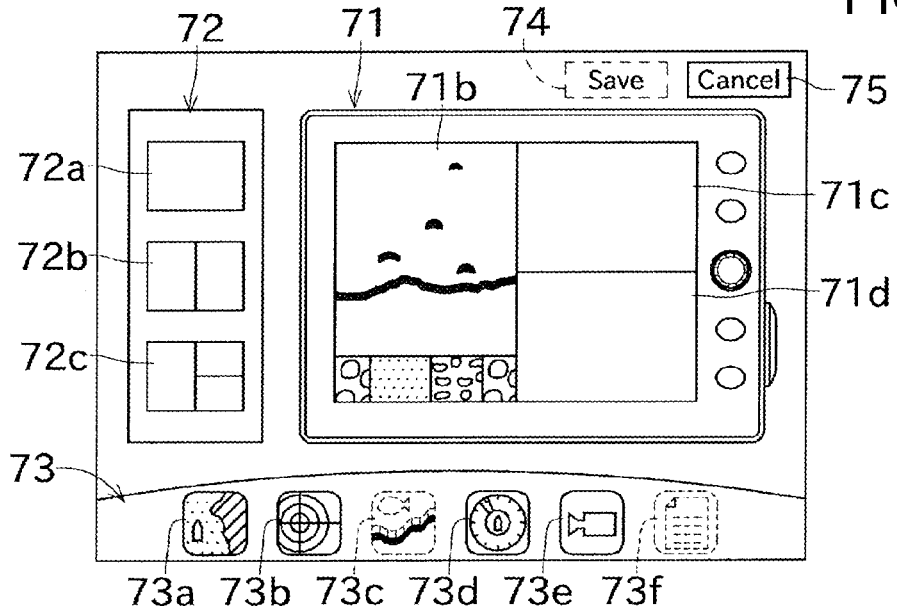

Further, as shown in FIGS. 11(a) and 11(b), the user drags the icon 73c to the information display area 71b where the nautical chart information is already displayed therein, and thereby, can switch the information displayed in the information display area 71b from the nautical chart information to the fish finding data.

Figure 12A:
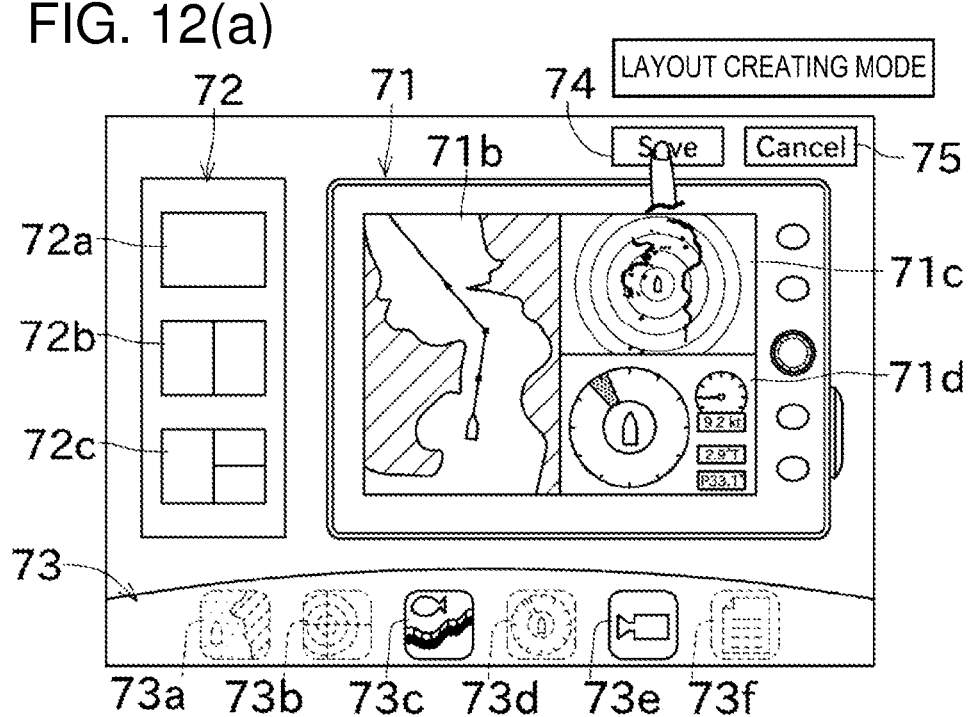
FIGS. 12(a) and 12(b) are views showing the display screen when the mode is shifted from the layout creating mode to the information display mode.
Figure 12B:
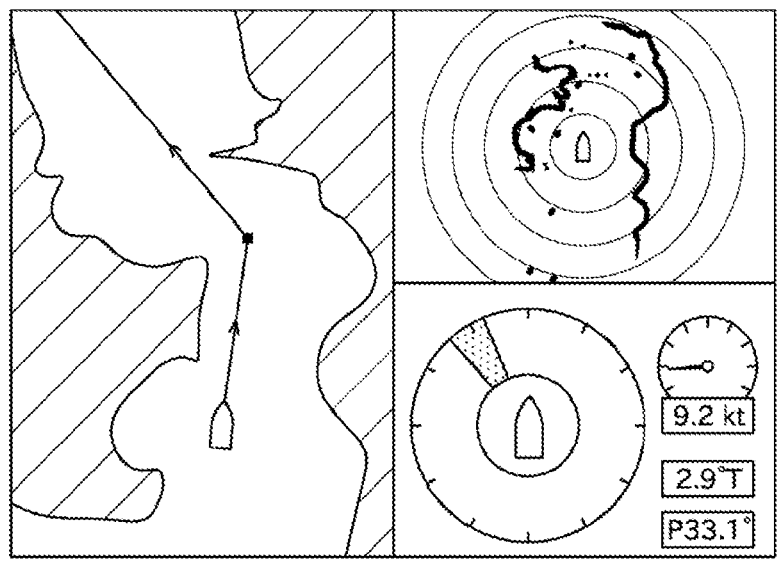

The user creates the information display layout by repeating the above operations, and when the creation is completed (S106), he/her touches the Save key 74 as shown in FIG. 12(a). In this manner, the layout creator 54 creates and saves the information which is currently displayed in the device image 71 as the information display layout.

As above, the creation of the information display layout completes and the mode is shifted to the information display mode (S107). After the information display mode, information is displayed in the created information display layout. Note that, the information display layout created and saved by the layout creator 54 is displayed when the mode is shifted to the layout selecting mode next.

Although a suitable embodiment of the present invention is described above, the above configuration may be modified as follows, for example.

The visual appearance, the arrangement, the sizes and the like of the keys, the marks, the icons and the like that are displayed in any of the modes are arbitrary, and may be different from the above embodiment.

Although the arrangement of the information display areas is illustrated in three patterns, the arrangement may be other than the above (e.g., four divisions).

The screen adding box 65 may be displayed in the layout selecting mode.

As the information to be displayed on the touch panel device 11, there may be adopted, other than the above, azimuth sensor information obtained from an azimuth sensor, speed sensor information obtained from a speed sensor, engine information obtained from an engine or the like, information in which a situation of traveling in the route obtained from the controller 25 is displayed, and information which is the combination of these information.

In the above embodiment, although the touch panel device 11 for a ship is illustrated, it may be a touch panel device which is installed in other movable bodies (e.g., an automobile and an airplane). Further, it may be a tablet PC, a smart phone, a portable information terminal, and the like, in which information created by a plurality of applications can be displayed by dividing a display screen.

DESCRIPTION OF NUMERALS

1 Ship Instrument Network System
10 Ship Network
11 Touch Panel Device (Information Display Device)
12 GPS Antenna (GNSS Sensor)
13 Radar Antenna
14 Fish Finder (Acoustic Sensor)
15 Heading Sensor
16 Autopilot Device
21 Display Unit
22 User Interface
23 Memory
24 Detector (Touch Detector)
25 Controller
51 Information Acquirer
52 First Display Controller
53 Second Display Controller
54 Layout Creator

What is claimed is:

1. An information display device provided in a ship instrument network system comprising the information display device and two or more navigation sensors selected from the group consisting of a GPS antenna, a radar antenna, an ultrasonic transducer, a heading sensor, and a vane anemometer, the information display device comprising:
a processor;
a display unit provided with one or more preset information display areas in its display screen, each information display area being associated with a size and an aspect ratio; and
memory storing one or more components that are executable by the processor, the one or more components comprising:
a touch detector configured to detect a user selection of an icon and a drag operation of the selected icon to a target information display area on the display screen through a touch operation on the display screen;
an information acquirer operatively coupled to the two or more navigation sensors, the information acquirer being configured to acquire at least two of navigation information showing a position of the device on a map obtained from the GPS antenna, underwater detecting information obtained from the ultrasonic transducer for detecting fish and/or a seabed underwater directly below the device, radar information obtained from the radar antenna for detecting a position of an object around the device, azimuth information obtained from the heading sensor, speed information, and wind information obtained from the vane anemometer;
a first display controller configured to display on the display screen, in a layout creating mode, icons indicating information that is acquirable by the information acquirer, and the one or more information display areas;
a second display controller configured to display in an information display mode, when the drag operation of the selected icon into the target information display area is detected in the layout creating mode, the information corresponding to the selected icon in the target information display area, when the display of the corresponding information fits the size or the aspect ratio of the target information display area; and
a layout creator configured to create an information display layout based on the content displayed by the second display controller in the layout creating mode,
wherein in the information display mode, the information corresponding to the selected icon is displayed in the target information display area on the display unit based on the information display layout, when the display of the corresponding information fits the size or the aspect ratio of the target information display area;
wherein in the layout creating mode, an information display layout is created through determining information to be displayed in the information display area and an arrangement of the information to be displayed; and
when the drag operation of the selected icon into the target information display area is detected, displaying the selected icon moving in a same direction as the drag operation from outside of the one or more information display areas into the target information display area.

2. The information display device of claim 1, wherein when the drag operation from inside to outside of the information display area where the information is already displayed is detected in the layout creating mode, the information that is displayed in the information display area is changed to be not displayed.

3. The information display device of claim 1, wherein when the icon corresponding to the information different from the information that is already displayed in the information display area is dragged into the same information display area in the layout creating mode, the information to be displayed in the information display area is switched to the information corresponding to the later dragged icon.

4. The information display device of claim 1, wherein in the layout creating mode, the icon of which the information is already displayed in the information display area is displayed in a display mode different from the other one or more icons.

5. The information display device of claim 1, wherein in the layout creating mode, the display unit displays a plurality of arrangement marks indicating the arrangement of the information display areas, and the information display areas are displayed in the arrangement indicated by the arrangement mark selected by a user.

6. The information display device of claim 1, wherein in the layout creating mode, when the target information display area cannot display the corresponding information to fit the size and aspect ratio of the target information display area, a display mode of the selected icon is changed or the selected icon is not displayed.

7. The information display device of claim 1, wherein in the layout creating mode, the display mode is different between an undisplayable information display area where the corresponding information is not displayable due to the size and aspect ratio of the undisplayable information display area, and a displayable information display area where the corresponding information is displayable.

8. The information display device of claim 1, wherein the display unit has a layout selecting mode in which a list of the information display layouts where the information is displayed, is displayed in the information display area, and
wherein the information display layout selected in the layout selecting mode is displayed in the information display mode.

9. The information display device of claim 8, wherein in the layout selecting mode, the information display layout created by the layout creator is also displayed.

10. An information display device provided in a ship instrument network system comprising the information display device and two or more navigation sensors selected from the group consisting of a GPS antenna, a radar antenna, an ultrasonic transducer, a heading sensor, and a vane anemometer,
the information display device comprising:
processor;
a display unit provided with one or more preset information display areas in its display screen, each information display area being associated with a size and an aspect ratio; and
memory storing one or more components that are executable by the processor, the one or more components comprising:
a touch detector configured to detect a user selection of an icon and a drag operation of the selected icon to a target information display area on the display screen through a touch operation on the display screen;
a first display controller configured to display on the display screen, in a layout creating mode, an icon indicating the application and the one or more information display areas;
a second display controller configured to display in an information display mode, when the drag operation of the selected icon into the target information display area is detected in the layout creating mode, the information corresponding to the selected icon in the target information display area, if the display of the corresponding information fits the size or the aspect ratio of the target information display area; and
a layout creator configured to create an information display layout based on the content displayed by the second display controller in the layout creating mode,
wherein in the information display mode, the information corresponding to the selected icon is displayed in the target information display area on the display unit based on the information display layout, if the display of the corresponding information fits the size or the aspect ratio of the target information display area;
wherein in the layout creating mode, an information display layout is created through determining information to be displayed in the information display area and an arrangement of the information to be displayed; and
when the drag operation of the selected icon into the target information display area is detected, displaying the selected icon moving in a same direction as the drag operation from outside of the plurality of information display areas into the target information display area.

11. An information display device provided in a ship instrument network system comprising the information display device and two or more navigation sensors selected from the group consisting of a GPS antenna, a radar antenna, an ultrasonic transducer, a heading sensor, and a vane anemometer, the information display device comprising:
a processor;
a display unit provided with one or more preset information display areas in its display screen, each information display area being associated with a size and an aspect ratio;
memory storing one or more components that are executable by the processor, the one or more components comprising:
a touch detector configured to detect a user selection of an icon and a drag operation of the selected icon to a target information display area on the display screen through a touch operation on the display screen;
an information acquirer operatively coupled to the two or more navigation sensors, the information acquirer being configured to acquire a plurality of information;
a first display controller configured to display on the display screen, in a layout creating mode, icons indicating information that is acquirable by the information acquirer, and the one or more information display areas;
a second display controller configured to display in an information display mode, when the drag operation of the selected icon into the target information display area is detected in the layout creating mode, the information corresponding to the selected icon in the target information display area, when the display of the corresponding information fits the size or the aspect ratio of the target information display area; and
a layout creator configured to create an information display layout based on the content displayed by the second display controller in the layout creating mode, wherein in the information display mode, the information corresponding to the selected icon is displayed in the target information display area on the display unit based on the information display layout, when the display of the corresponding information fits the size or the aspect ratio of the target information display area;

wherein in the layout creating mode, an information display layout is created through determining information to be displayed in the information display area and an arrangement of the information to be displayed; and when the drag operation of the selected icon into the target information display area is detected, displaying the selected icon moving in a same direction as the drag operation from outside of the one or more information display areas into the target information display area.

12. A computer-implemented method for displaying information on an information display device provided in a ship instrument network system, wherein the system comprises the information display device and two or more navigation sensors selected from the group consisting of a GPS antenna, a radar antenna, an ultrasonic transducer, a heading sensor, and a vane anemometer, wherein the information display device comprises a processor, a display unit provided with one or more preset information display areas in its display screen, memory storing one or more components that are executable by the processor, the one or more components comprising a touch detector, an information acquirer, a first display controller, a second display controller, and a layout creator, the computer-implemented method comprising:

detecting, with the touch detector, a user selection of an icon and a drag operation of the selected icon to a target information display area on the display screen through a touch operation on the display screen;

acquiring a plurality of information with the information acquirer that is operatively coupled to the two or more navigation sensors;

displaying with the first display controller, in a layout creating mode, icons indicating information that is acquirable by the information acquirer, and the one or more information display areas;

displaying in an information display mode with the second display controller, when the drag operation of the selected icon into the target information display area is detected in the layout creating mode, the information corresponding to the selected icon in the target information display area, when the display of the corresponding information fits the size or the aspect ratio of the target information display area; and creating, with the layout creator in the layout creating mode, an information display layout based on the content displayed with the second display controller when the drag operation is detected, wherein in the information display mode, the information corresponding to the selected icon is displayed in the target information display area based on the information display layout;

wherein in the layout creating mode, an information display layout is created through determining information to be displayed in the information display area and an arrangement of the information to be displayed;

when the drag operation of the selected icon into the target information display area is detected, displaying the selected icon moving in a same direction as the drag operation from outside of the one or more information display areas into the target information display area; and responsive to the information acquirer receiving the plurality of information from the two or more navigation sensors, displaying the plurality of information corresponding to the icon in the information display area that is the destination of the drag operation, displaying in the information display area, one of navigation information obtained from the GPS antenna, radar information obtained from the radar antenna, azimuth information obtained from the heading sensor, speed information, underwater detecting information obtained from the ultrasonic transducer, and wind information obtained from the vane anemometer.

* * * * *